(12) United States Patent
Qiu et al.

(10) Patent No.: US 6,555,488 B1
(45) Date of Patent: Apr. 29, 2003

(54) THREE-DIMENSIONALLY REINFORCED CELLULAR MATRIX COMPOSITE AND METHOD OF MAKING SAME

(75) Inventors: Yiping Qiu, Raleigh, NC (US); Mansour H. Mohamed, Raleigh, NC (US); Wei Xu, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/376,109

(22) Filed: Aug. 17, 1999

(51) Int. Cl.$^7$ .................. D03D 11/00; D03D 13/00; B32B 5/24
(52) U.S. Cl. .................. 442/205; 442/203; 442/204; 442/207; 442/218; 442/221; 442/226; 442/251; 442/253
(58) Field of Search .................. 442/204, 203, 442/205, 207, 218, 221, 226, 251, 253; 428/911

(56) References Cited

U.S. PATENT DOCUMENTS

| | | | |
|---|---|---|---|
| 4,473,665 A | | 9/1984 | Martini-Vvedensky et al. |
| 4,966,801 A | * | 10/1990 | Becker et al. ............... 428/113 |
| 5,158,986 A | | 10/1992 | Cha et al. |
| 5,334,356 A | | 8/1994 | Baldwin et al. |
| 5,465,760 A | | 11/1995 | Mohamed et al. |
| 5,637,375 A | * | 6/1997 | Hohman ..................... 428/113 |
| 6,045,898 A | * | 4/2000 | Kishi et al. ................. 428/245 |

* cited by examiner

Primary Examiner—Elizabeth M. Cole
Assistant Examiner—Ula C. Ruddock
(74) Attorney, Agent, or Firm—Jenkins & Wilson, P.A.

(57) ABSTRACT

A light-weight and impact-resistant composite material formed from a three-dimensional textile structure preform comprising at least three systems of yarns that define a plurality of interstices within the textile structure. A cellular matrix material impregnates the textile structure so as to fill the interstices of the three-dimensional textile structure and to coat at least a portion of the surface area thereof.

11 Claims, 9 Drawing Sheets

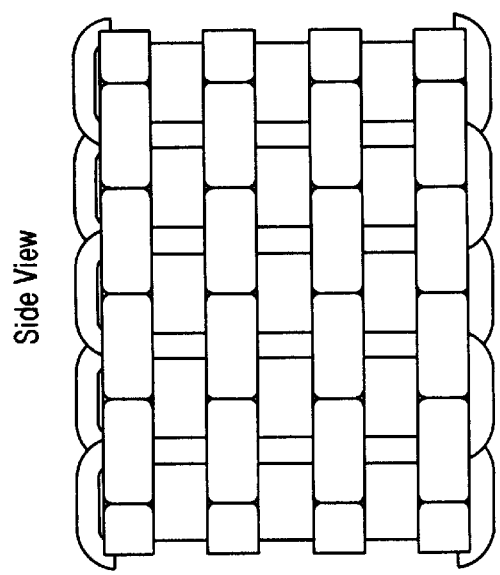
Side View
FIG. 2B
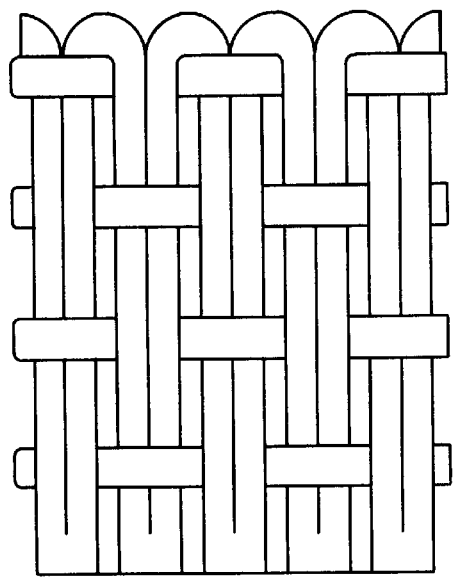
Top view
FIG. 2C
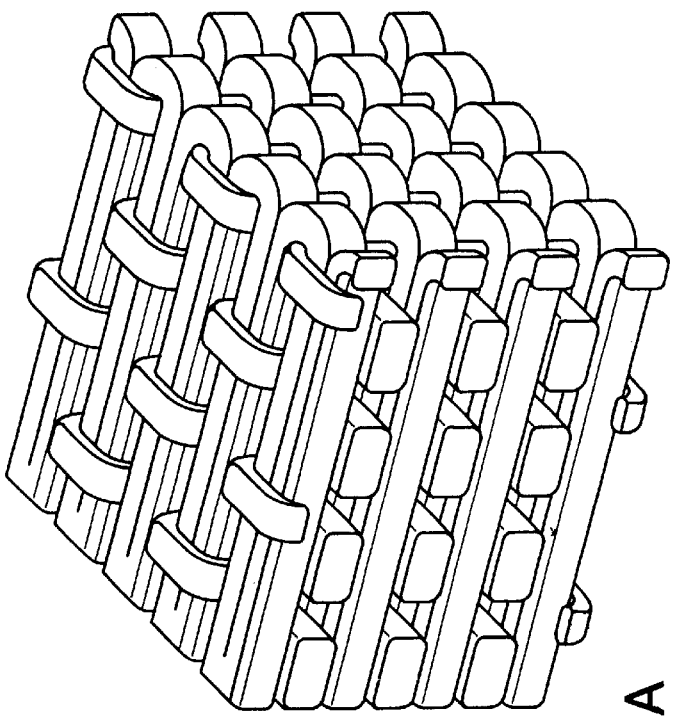
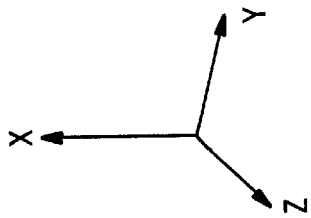
FIG. 2A

US 6,555,488 B1

THREE-DIMENSIONALLY REINFORCED CELLULAR MATRIX COMPOSITE AND METHOD OF MAKING SAME

TECHNICAL FIELD

The present invention relates to cellular foamed materials, and more particularly to a three-dimensionally reinforced cellular matrix composite material characterized by lightweight and high impact resistance properties.

BACKGROUND

The use of high-performance composite fiber materials is becoming increasingly common in applications such as aerospace and aircraft structural components. As is known to those familiar with the art, fiber reinforced composites consist of a reinforcing fiber such as carbon or KEVLAR® and a surrounding matrix of epoxy resin, PEEK or the like. Most of the well-known composite materials are formed by laminating several layers of textile fabric, by filament winding or by cross laying of tapes of continuous filament fibers. However, all of the laminated structures tend to suffer from a tendency toward delamination. Thus, efforts have been made to develop three-dimensional braided, woven and knitted preforms as a solution to the delamination problems inherent in laminated composite structures. Representative three-dimensional textile preforms are disclosed in U.S. Pat. No. 5,465,760 issued to Mohamed et al. on Nov. 14, 1995 and U.S. Pat. No. 5,085,252 issued to Mohamed et al. on Feb. 4,1992.

Also, it is well-known to make conventional foamed materials, such as foamed polymer plastic materials, that have microcellular voids distributed throughout the material. Standard techniques for this purpose normally use chemical or physical blowing agents. For example, chemical blowing agents are low molecular weight organic compounds which decompose at a critical temperature and release a gas or gases such as nitrogen, carbon dioxide, or carbon monoxide. Methods using physical agents include the introduction of a gas as a component of a polymer charge or the introduction of gases under pressure into molten polymer. These well-known and standard foaming processes produce voids or cells within the plastic materials which are relatively large (for example, on the order of 100 microns or greater), as well as relatively wide ranges of void fraction percentages, for example from 20% to 90% of the parent material. The number of voids per unit volume is relatively low and often there is a generally non-uniform distribution of the cells throughout the foam material such that the materials tend to have relatively low mechanical strengths and toughness. See, for example, U.S. Pat. No. 3,796,779 issued to Greenberg on Mar. 12, 1976.

It is also well-known in the foamed materials art that in order to improve the mechanical properties of conventional cellular foam materials, a microcellular process was developed for manufacturing foam plastics having greater cell densities and smaller cell sizes. See, for example, U.S. Pat. No. 4,473,665 issued on Sep. 25,1984 to J. E. Martini-Vredrensky et al. The improved technique provides for pre-saturating the plastic material to be processed with a uniform concentration of a gas under pressure and the provision of a sudden induction of thermo-dynamic instability in order to nucleate a large number of cells. For example, the material can be pre-saturated with the gas and maintained under pressure at its glass transition temperature, and the material then suddenly exposed to a low pressure to nucleate cells and promote cell growth to a desired size, depending on the desired final density, and thereby producing a foamed material having microcellular voids or cells therein. The material is then quickly further cooled, or quenched, to maintain the microcellular structure.

Additional work in producing microcellular foam plastic material is described in U.S. Pat. No. 4,761,256 issued on Aug. 2, 1988 to Hardenbrook et al. Further, U.S. Pat. No. 5,334,356 and U.S. Pat. No. 5,158,986 both issued to Baldwin et al. disclose apparatus and process for forming a supermicrocellular foamed material having cells distributed throughout the material with average cell sizes being at least less than 2.0 microns and preferably in a range from about 0.1 micron to about 1.0 micron.

Although all of the above is well-known to those skilled in the textile arts and microcellular foamed material arts, applicants have recognized the need for an improved three-dimensional composite material which does not tend to delaminate and that possesses lightweight and very high impact resistance. Toward that end, applicants have developed a new three-dimensionally reinforced cellular matrix composite and the method for making the product that allows for the formation of three-dimensional reinforced composites with a cellular matrix that contains intentionally induced voids. The voids render the composite material extremely light in weight while simultaneously providing enhanced impact resistance and enhanced specific bending stiffness. Applicants believe that this novel composite material is new in the composite art and meets a long-felt need for such a product and a method for making the product.

Summarily, applicants have discovered a novel three-dimensionally reinforced cellular matrix composite and a method for making the same that combines cellular technology with three-dimensional textile preform technology in order to provide a novel lightweight composite material with superior structural integrity.

DISCLOSURE OF THE INVENTION

In accordance with the present invention, applicants provide a lightweight and impact resistant composite material comprising a three-dimensional textile structure preform formed of at least three systems of yarns that define a plurality of interstices within the textile structure. A cellular matrix material fills the interstices of the three-dimensional textile structures and coats at least a portion of the surface area of the three-dimensional textile structure.

In accordance with another aspect of the present invention, applicants provide a method of producing a three-dimensionally reinforced cellular matrix composite including providing a three-dimensional textile structure preform formed of at least three systems of yarns that define a plurality of interstices within the textile structure. Next, a foamable polymer material is introduced to the three-dimensional textile structure preform so as to fill the interstices and impregnate the three-dimensional textile structure preform and to coat at least a portion of the surface area of the structure. The foamable polymer material is then foamed to produce a microcellular foamed polymer material containing a plurality of voids or cells distributed substantially throughout the foamable polymer material.

It is therefore an object of the present invention to provide a three-dimensionally reinforced cellular matrix composite that is lightweight and impact resistant.

It is another object of the present invention to provide a three-dimensionally reinforced cellular matrix composite that incorporates a three-dimensional textile structure preform in order to provide enhanced structural integrity.

It is another object of the present invention to provide a three-dimensionally reinforced cellular matrix composite that incorporates a three-dimensional textile structure preform to provide enhanced performance characteristics including enhanced resistance to delamination.

It is still another object of the present invention to provide a three-dimensionally reinforced cellular matrix composite that incorporates a three-dimensional textile structure preform and that provides enhanced resistance to delamination, enhanced impact resistance, enhanced fatigue life, enhanced strength-to-weight ratio, and enhanced stiffness-to-weight ratio.

Some of the objects of the invention having been stated, other objects will become apparent with reference to the drawings described hereinbelow.

BRIEF DESCRIPTION OF THE DRAWINGS

FIG. 1 is a top plan view of the three-dimensionally reinforced cellular matrix composite of the invention;

BEST MODE FOR CARRYING OUT THE INVENTION

Figure 2B:
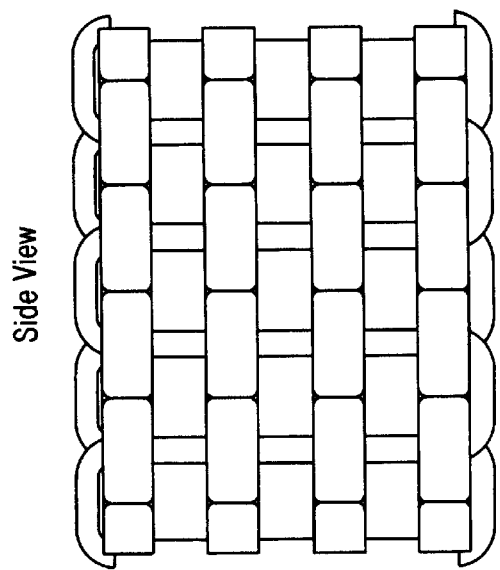
FIGS. 2A–2C show a perspective, side and top view, respectively, of a three-dimensional orthogonally woven preform which is utilized in one embodiment of the three-dimensionally reinforced cellular matrix composite of the present invention.
Figure 2C:
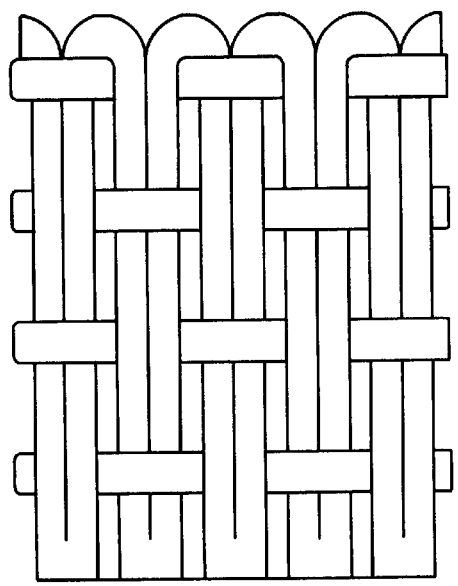
Figure 2A:
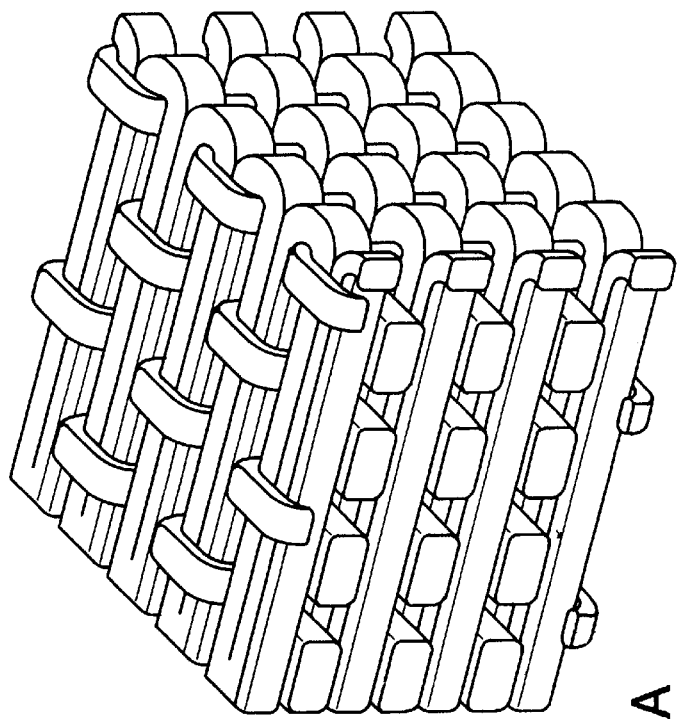
Figure 3:
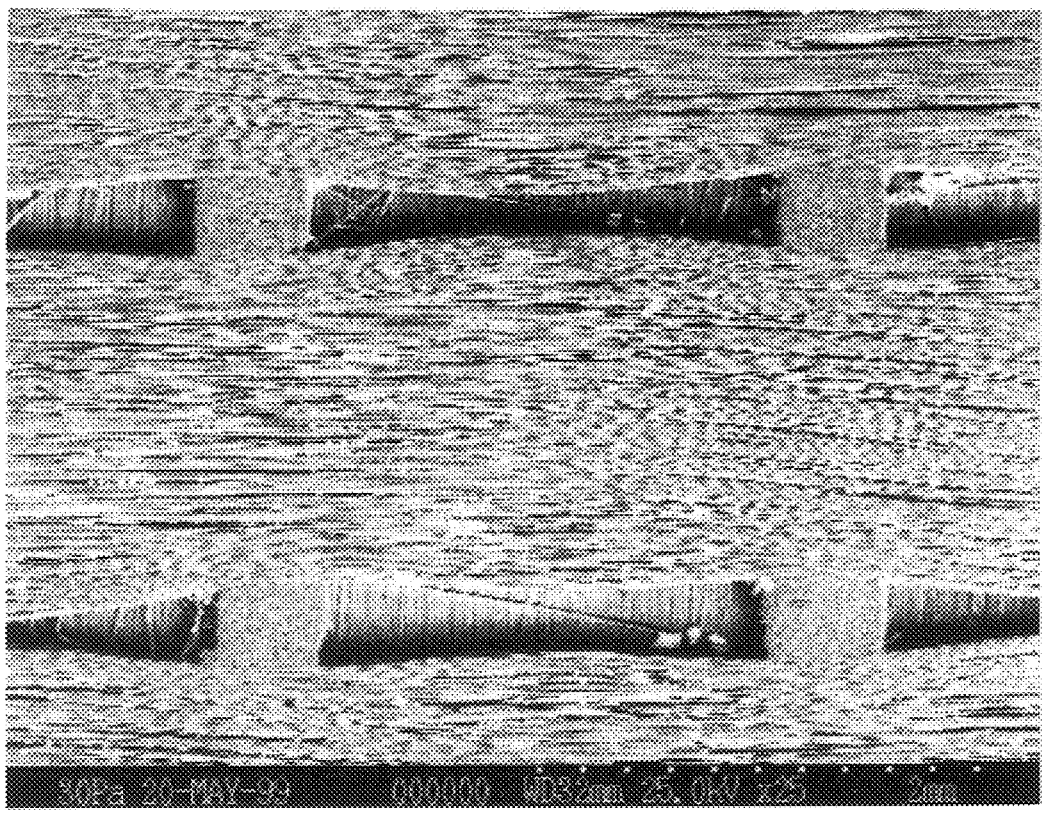
FIG. 3 is a photomicrograph view in the Z yarn direction of the three-dimensionally reinforced cellular matrix composite of the present invention.
Figure 4:
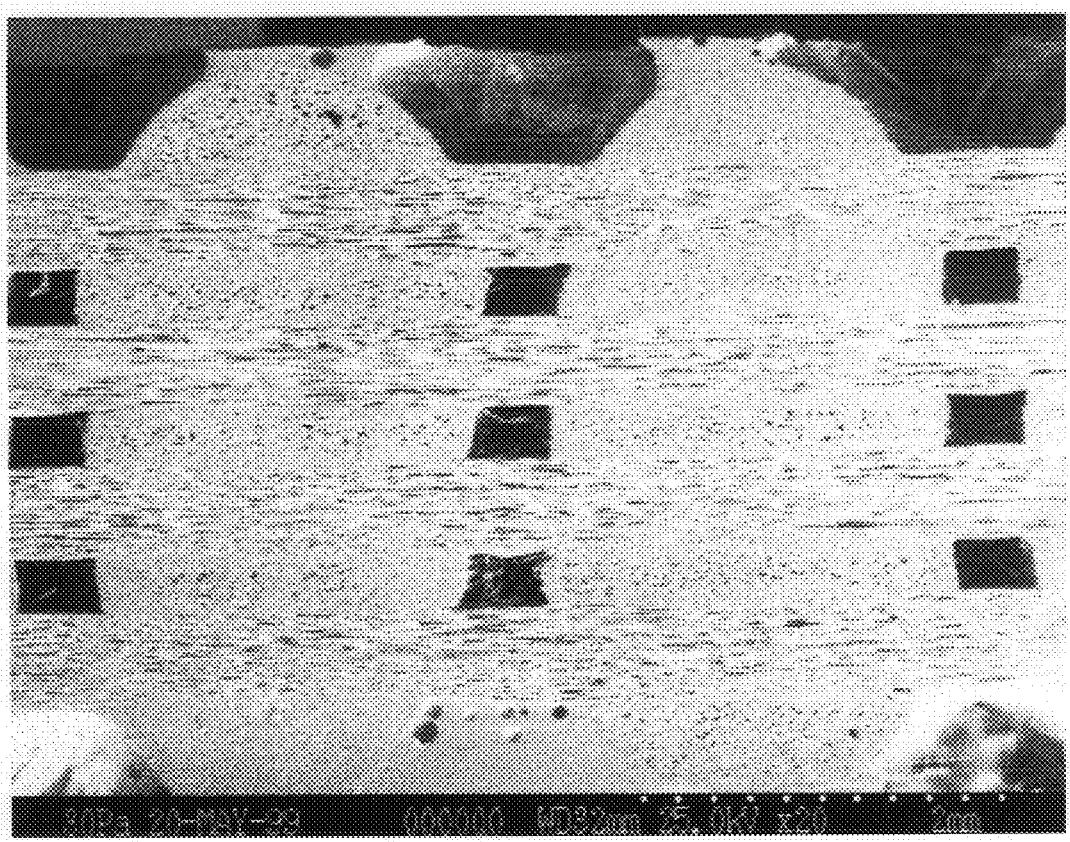
FIG. 4 is a photomicrograph view in the Y yarn direction of the three-dimensionally reinforced cellular matrix composite of the present invention.
Figure 5:
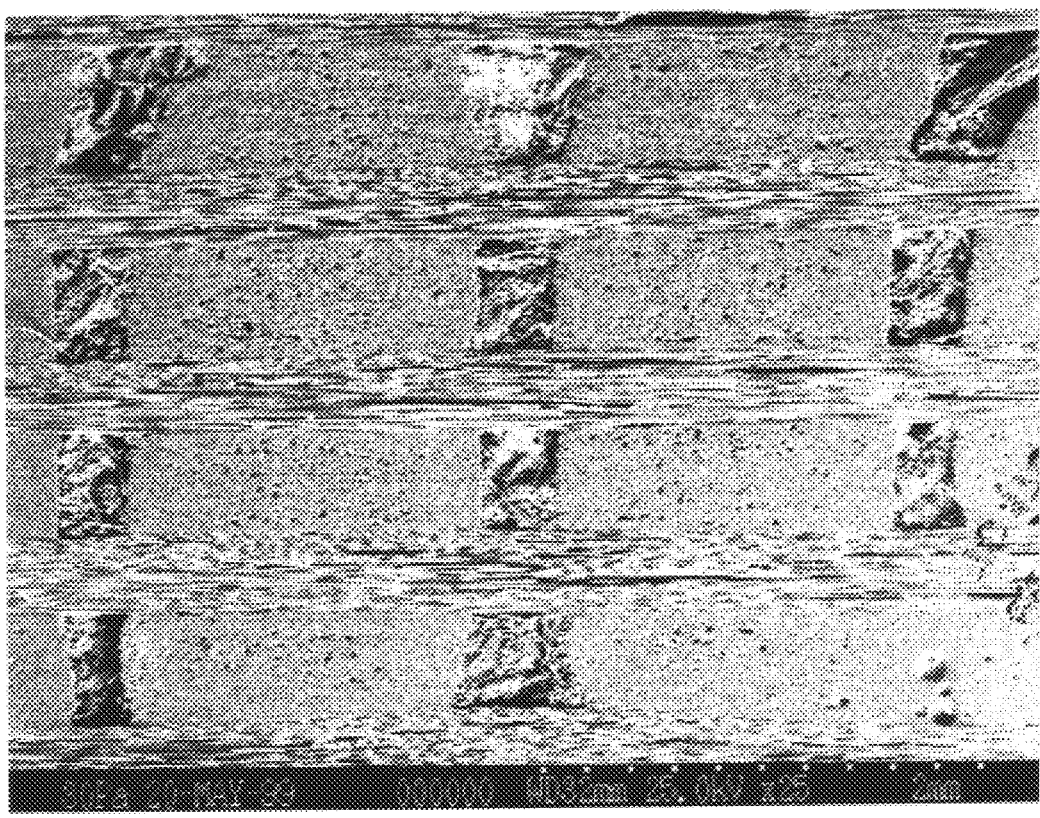
FIG. 5 is a photomicrograph view in the X yarn direction of the three-dimensionally reinforced cellular matrix composite of the present invention.

Referring now to FIGS. 1–10 of the drawings, applicants wish to describe the three-dimensionally reinforced cellular matrix composite C and method of making the same of the present invention. Although FIG. 2 illustrates an orthogonally woven three-dimensional preform, the invention is not intended to be limited to this structure but to include other three-dimensional textile structure preforms formed of at least three systems of yarns so as to provide interstices within the structure and structural integrity to composite C. These structures can include woven, braided, circular woven and knitted three-dimensional structures formed of at least three different yarn systems.

Applicants have developed a novel three-dimensionally reinforced composite C and novel method for making the composite such that the three-dimensionally reinforced composite contains voids of various sizes in the matrix. The uniqueness of applicants' inventive product and process is the combination of known cellular technology with known three-dimensional textile preforms with inherent structural integrity. The unexpected and surprising result is a novel composite that has significantly less specific density (e.g., 0.88 to 1.02 grams/cm$^3$) than a conventional three-dimensional composite (e.g., 1.44 grams/cm$^3$) and that has higher impact-resistance, higher fatigue resistance, higher specific tensile strength, and compression strength, higher specific tensile modulus, and higher specific bending stiffness.

A. Theoretic Basis of the Composite

Formation of voids in epoxy matrix may be fulfilled with either chemicals or simple gases as blowing agents. In order to avoid interaction of chemical blowing agent on the fiber/matrix system and also to control the size of the voids, simple gases are used in applicants' testing of the invention. The foaming process of a thermoset matrix consists of three stages: gas saturation, nucleation of cells and cell growth. The matrix is first saturated with simple gases such as $CO_2$ and $N_2$ under high pressure (1000–3000 psi). At a certain viscosity during the matrix curing process, the pressure is abruptly released, creating a thermodynamic instability, which leads to nucleation and growth of cells or bubbles. The matrix viscosity, when the pressure is released, determines the bubble size. The cells typically define a void diameter of between about 0.01 to 10.0 µm, but cell void diameter can be larger.

Nucleation of gaseous cells in the matrix of fiber-reinforced composite C can occur under three mechanisms: (1) homogenous nucleation occurring in the homogeneous polymer phase, (2) heterogeneous nucleation occurring at the interface of polymer and filler (e.g., particles, fibers, etc.) phases, and (3) a combined mode of (1) and (2). A reversible process of the homogeneous nucleation of a gaseous cell can be described by the following equation:

$$\Delta G_{hom} = -V_b \Delta P + A_{bm} \gamma_{bm}$$

where $\Delta G_{hom}$ is the Gibbs free energy for homogeneous nucleation, $V_b$ is the volume of the bubble nucleus, $\Delta P$ is the pressure change which can be as high as a few thousand psi when simple gases are the blowing agents, $A_{bm}$ is the surface area of the bubble nucleus, and $Y_{bm}$ is the surface energy of the bubble-polymer interface.

For a heterogeneous nucleation process where bubbles nucleate at the interface of reinforcing fibers and the matrix, the Gibbs free energy needed to nucleate a critical nucleus can be found with the following equation:

$$\Delta G^*_{het} = \Delta G^*_{hmo} S(\Theta)$$

where $$S(\Theta) = \frac{1}{4}(2 + \cos\Theta)(1 - \cos\Theta)^2$$

and θ is the wetting angle. Therefore, the rate of heterogenous nucleation is as follows:

$$N_{het} = N_1 \exp\left(\frac{-\Delta G^*_{het}}{kT}\right)$$

For a combined nucleation mode, applicants joined nucleation rate is computed as follows:

$$N = N_{het} + \omega N_{hom}$$

where $\omega$ is a reduction factor to $N_{hom}$ due to $N_{het}$.

The growth of the bubbles by gas diffusion can be presented by a mass balance at the bubble surface as follows:

$$\frac{d}{dt}\left(\frac{4}{3}\pi r_b^3 C_b\right) = 4\pi r_b^2 D\left(\frac{\partial C}{\partial r}\right) r = r_b$$

which is subjected to the following boundary conditions:

$$C(t, r_b) = P/m$$
$$\frac{\partial C(t, r_m)}{\partial r} = 0$$

where C is the concentration of the gas in the polymer matrix, $C_b$ is that gas concentration in the bubble, D is the diffusion coefficient of the gas in the matrix, m is the Henry's constant, $r_b$ is the bubble radius and $r_m$ is the radius of the diffusion boundary.

In the case of a thermosetting resin being used, the process of bubble formation, including nucleation and growth, is in conjunction with the cure of the resin. The reaction rate equation may be written as follows:

$$-r_R = \frac{dC_R}{dt} = k_R C_R^\alpha$$

where $r_R$ is the rate of the consumption of the resin, $\alpha$ is the order of the reaction with respect to the concentration of the resin, $C_R$, and $k_R$ is the rate constant.

Since the resin becomes more and more viscous during polymerization and finally solidifies, the diffusion of the gas is then gradually reduced and therefore the growth of the bubble gets slower or even ceases. Thus, the process needs to be controlled such that the bubble formation begins after the viscosity of the resin has reached a certain value so that the bubbles would not coalesce, and completes before the resin has fully solidified.

The diffusion coefficient of the gas in the matrix is a function of the gas concentration is:

$$D = D_0 \exp(aC)$$

where a is the plasticizing factor, $D_0$ is the zero concentration diffusivity. D is temperature dependent and is also, in the case of thermosetting resin being used, affected by the changing viscosity of the resin during cure.

Fabricating and Testing Procedures for Development of Composite C

The 3-D fabric can be fabricated on one of the 3-D weaving machines located in the 3-D Weaving Laboratory of the College of Textiles of North Carolina State University in Raleigh, N.C. The fabric preform will be impregnated in epoxy resin and cured to form composite samples.

In order to fabricate 3-D woven fabric composites C of desired properties with appropriate bubble sizes and volume fraction, it is necessary to investigate the effects of properties of the materials employed for making composites and operation conditions, such as solubility and diffusivity of the gas in the matrix material, the operating temperature and pressure, and the batch operating time on the bubble formation process, including bubble nucleation, bubble growth by diffusional mass transfer, as well as their effects on the cure of the resin which in turn has an influence on the diffusion of the gas. With the following experiments, applicants were able to acquire the data necessary for understanding and controlling the fabrication process to produce the required composites C.

1. Gas Solubility and Diffusivity in Matrix Material.

To determine gas diffusivity within a thermosetting resin, a bubble of a given gas is injected into the resin and then observed under an optical microscope. Due to the diffusion of the gas from the bubble into the resin, the radius of the bubble gradually decreases. By this experiment, diffusivities of the gas in the resin of variant degree of polymerization can be obtained. The solubility can be acquired with a gas-saturated sample by means of gas-chromatography (GC) or high pressure liquid-chromatography (HPLC).

2. Cure Kinetics of Thermosetting Resin.

Infrared spectroscopic investigation is to be employed to determine the resin cure kinetics so that the duration time during which resin is getting solidified with significant gas diffusion can be obtained. In situ IR spectroscopy enables concentration of individual chemical species to be obtained in real time. Resins are also quenched at various times to terminate the reactions for the determination of cure conversion, and the measurement of the gas diffusivity and the viscosity of the intermediate product. The viscosity and conversion parameters are to be correlated with the diffusivity.

3. Bubble Formation.

In the case of thermosetting polymer being used to form the matrix, the 3-D fabric preform is first impregnated with the resin and then bubbles are to be formed before the complete cure of the resin. In addition to the pressure control and gas saturation and release temperature control, monitoring of the cure time of the resin serves as another important key to bubble formation. The nucleated bubbles will grow up to almost complete cure of the resin. The amount of the bubble formed are determined by the amount of gas released during the time that the comprising processes concur, i.e., the nucleation of the bubbles, the diffusional mass transfer of the gas across the interface, and the cure reaction of the resin.

Bubble size and total volume fraction in the matrix can be observed with a microscope and measured by means of stereological micrograph analysis. The difference in gas solubility in the polymer/resin under the different conditions before and after bubble formation represents the driving force for the process, and the solubility data can be used to predict the total amount of the gas to be released to form bubbles. While the actual number of the bubbles nucleated depends on the activation energy involved in overcoming the barrier for nucleation, and the sizes of the bubbles depend on how much gas will transfer by diffusion from the matrix to each of these bubble sites.

4. Process Control and Modeling.

The pattern of the bubbles formed in the matrix depends on the trajectories of the temperature and pressure during the whole process of bubble formation. Experimental data are processed with the theoretical equations to set forth herein to acquire the relationships between the operation parameters (such as the temperatures, the pressures, and batch operation time) and the matrix features of the composites (bubble fraction, bubble sizes and size distribution) for the process control and modeling. With this knowledge, applicants were able to optimize the formation of experimental composites with the desired properties. Since these processes are highly non-linear, a novel optimization method, genetic algorithm, will be used to search the optimal solution to this problem.

5. Mechanical Property Testing.

Tensile and compression tests can be performed in both composite warp and filling (planar) directions. The tensile test can be carried out according to ASTM Standard D3039-76 [8] on an INSTRON machine. The compression test can be conducted following ASTM Standard D3410-87. In general, shear properties of composites C are tested using standard test methods such as the conventional short beam bending test. For 3-D composites, since no delamination occurs, applicants developed a unique test to test their interlaminar shear strength using a special shear fixture. This method was used in the experimental testing of the novel composite C.

B. Experimental Testing Apparatus and Procedures

Figure 6:
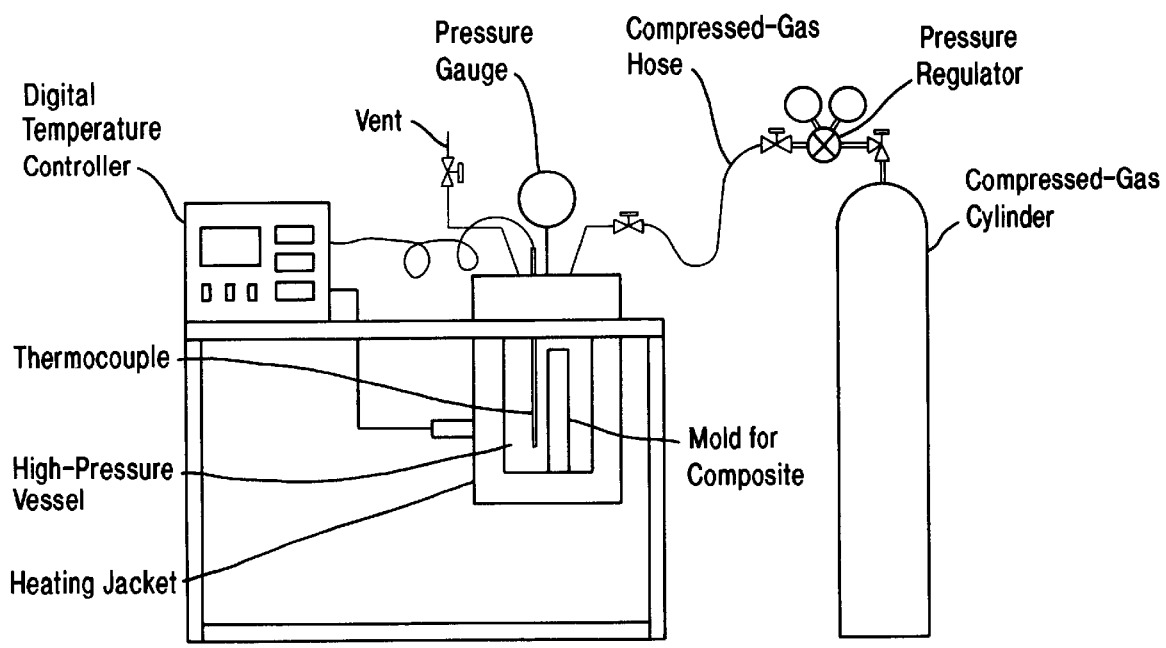
FIG. 6 is a schematic view of a testing apparatus for making the three-dimensionally reinforced cellular matrix composite of the present invention.

One unique characteristic of the fabrication of the novel composite C is the foaming of the epoxy resin matrix. Foaming by free expansion of epoxy resin was carried out by applicants using the experimental apparatus shown in FIG. 6, including the following testing equipment:

FIG. 6 Apparatus for Foaming of Epoxy Resin.

1. High-Stirred High-Temperature/High-Pressure Vessel available from Parr Instrument Company (Moline, Ill.) Model 4672. Maximum pressure: 3,000 psi (207 bar); maximum temperature: 600° C.; diameter: 5.5 in.; depth: 9.95 in.; volume: 1 gallon.
2. Floor Stand Ceramic Heater available from Parr Instrument Company (Moline, Ill.) Model 4933 Wattage 3,000; volume: 1 gallon.
3. Digital Temperature Controller available from Parr Instrument Company (Moline, Ill.) Model 4842.
4. High Inlet/Outlet Pressure Regulator available from Matheson Gas Products (Morrow, Ga.) Model 3064-677. Delivery pressure: 200–6,000 psig (13.6–408.2 bar); delivery pressure gauge: 0–5,000 psig (0–340.1 bar); cylinder pressure gauge: 0–7,500 psig (0–510.2 bar).
5. Pressure Hose Assembly available from Parr Instrument Company (Moline, Ill.) Model A495HC. Maximum pressure: 2,500 psig (170 bar); length 6 ft.

Testing Procedures

1. Preparation of epoxy solution: EPON Resin 9405 and EPI-CURE 9470 Curing Agent were weighed and added into a container with the mix ratio being 100/28, then stirred to form a homogeneous solution.
2. Preparation of fabric preform: a 3-D woven carbon fabric preform was cut to the desired size and weighed. The fabric size was 4.0×8.0 inches. Due to the limited availability of fabric, two types of fabric with different fabric parameters were used for making composites. Fabric parameters are listed in Table 1 below.

TABLE 1

Parameters of 3-D Woven Carbon Fabric Preforms

| Label | Warp (x) yarn | Weft (y) yarn | Z-yarn | Ends/in | Picks/in | Thickness (mm) |
|---|---|---|---|---|---|---|
| TM | 12 K | 6 K | 3 K | 15 | 24 | 4.57 |
| TS | 12 K | 6 K | 3 K | 14 | 20 | 4.50 |

3. Wetting of fabric preform with resin: the fabric preform was soaked in the epoxy resin solution and vacuumed (PRECISION SCIENTIFIC vacuum pump Model DD-100) at 100° C. (ISOTEMP® vacuum oven, Fisher Scientific Model 285A) for several minutes (e.g., 5–10 minutes) to expel air bubbles and ensure fully wetting of fibers with the resin.
4. Molding: the resin-impregnated preform was removed from the resin solution and wrapped up with bleeder and release fabric, for removal of excess resin from the surface of the preform and for ease of removal of the composite C from the mold, respectively. The Breather & Bleeder fabric used was AIRWEAVE® S, and the release fabric (or peel ply) was RELEASE EASE 234 TFP, both from AIRTECH International, Inc. This package was placed in between the two plates of the mold. The plates have a plurality of holes to allow gaseous blowing agents to penetrate into the woven fabric preform through the plates as well as the bleeder and release fabrics. The mold was then assembled by tightening the screws.
5. Loading of vessel with mold: the mold was placed in the vessel and then the vessel head was sealed by tightening the cap screws using a torque wrench (Sears CRAFTSMAN® MICROTORK® torque wrench Model 44541) at a torque of 35 ft-lbs. This 35 ft-lbs. torque was required for the Model 4672 high-pressure vessel of 3,000 psi, although the working pressure was usually lower than this value. Then, the vent valve was closed and the inlet valve was opened. To prolong the lifetime of the graphite gasket (Parr Instrument Company Model 1812 HCKL) and ensure good sealing of the vessel, the gasket was lubricated with KEL 110 silicone spray (available from Kellogg's Professional Products, Inc.) before assembling the vessel head.
6. Filling gaseous blowing agent: the deliver valve was opened to let the gaseous blowing agent (e.g., nitrogen gas) fill in the vessel until the pressure reaches a required value, in a range from 20 to 120 bars, then close the inlet of the vessel. Work was done as the gas flowed into the vessel and consequently the temperature of the system increased by a few degrees (e.g., 5–15° C., depending on the value of pressure).
7. Absorption of gas into resin: the absorption of the gas into the resin solution began once the gas had been introduced into the vessel. Then, the heater was turned on and the vessel temperature increased from room temperature to a moderate temperature $T_1$. Timing was started and the temperature kept constant for $t_1$ hours as required. Fluctuation of the temperature was 1° C. about $T_1$. To enhance the diffusion of the gas molecules into the resin and to ensure saturation of the resin with the gas, $T_1$=40° C. and $t_1$=12 hours were selected. During this time, curing of the resin proceeded very slowly.
8. Curing and foaming of resin: once time reached $t_1$, the heater was set at a higher temperature $T_2$ (e.g., 100° C.) which allowed the resin system to cure much faster. The system was maintained at $T_2$ for $t_2$=1.5–2.5 hours (before complete cure). Bubble nucleation was triggered by a sudden pressure quench when the time of curing reached $t_2$. Due to the small diameter of the outlet from the vessel head, this degassing process usually lasts for about 30–60 seconds. Excess resin that resided in empty pockets of the 3-D woven carbon were blown out of the preform and absorbed by the bleeder fabric. Before the heater was turned off, the system temperature was maintained at $T_2$ for several hours (e.g., 4 more hours) to allow complete cure of the foamed resin.

9. Removal of the composite: after post cure for about 3–4 hours, the vessel was opened and the mold was removed from the vessel. The composite sample was removed from the mold, and then weighed and labeled. Testing specimens for tensile, bending and impact tests were prepared from the samples.

Fabrication of 3-D Woven Carbon Fabric Reinforced Composites with Regular (Non-Foamed) Epoxy Matrix The purpose of fabrication of 3-D woven carbon fabric reinforced composites with regular epoxy matrix was to provide comparison for the inventive composites C fabricated by the procedures described above. Procedures of fabrication of "regular" composites were the same as the first several steps for the new type of composites, but without the process steps of absorption of gas and foaming of epoxy:

1. Preparation of epoxy solution: EPON Resin 9405 and EPI-CURE 9470 Curing Agent were weighed and added into a container with the mix ratio being 100/28, and then stirred to form a homogeneous solution.
2. Preparation of fabric preform: a 3-D woven carbon fabric preform was cut to the desired size and weighed. The fabric parameters and dimensions of the preform were the same as those for the new composites C, as listed in Table 1.
3. Wetting of fabric preform with resin: the fabric preform was soaked in the epoxy resin solution and vacuumed (Precision Scientific vacuum pump Model DD-100) at 100° C. in an oven (ISOTEMP® vacuum oven, Fisher Scientific Model 285A) for a few minutes (e.g., 5–10 minutes) to expel air bubbles and ensure fully wetting of fibers with resin.
4. Molding: the resin-impregnated preform was wrapped with release fabric (for ease of un-molding from the mold) and placed in a mold that consisted of two aluminum plates and spacer bars controlling the thickness of the composite sample. The release fabric (or peel ply) was RELEASE EASE 234 TFP available from AIRTECH International, Inc.
5. Curing of epoxy resin: the mold system was placed in the oven at 100° C. for at least 4 hours to allow complete cure of the epoxy resin.
6. Removal: composite samples were removed from the mold, and then weighed and labeled. Testing specimens for tensile, bending and impact tests were prepared from samples.

C. Test Results

Figure 7:
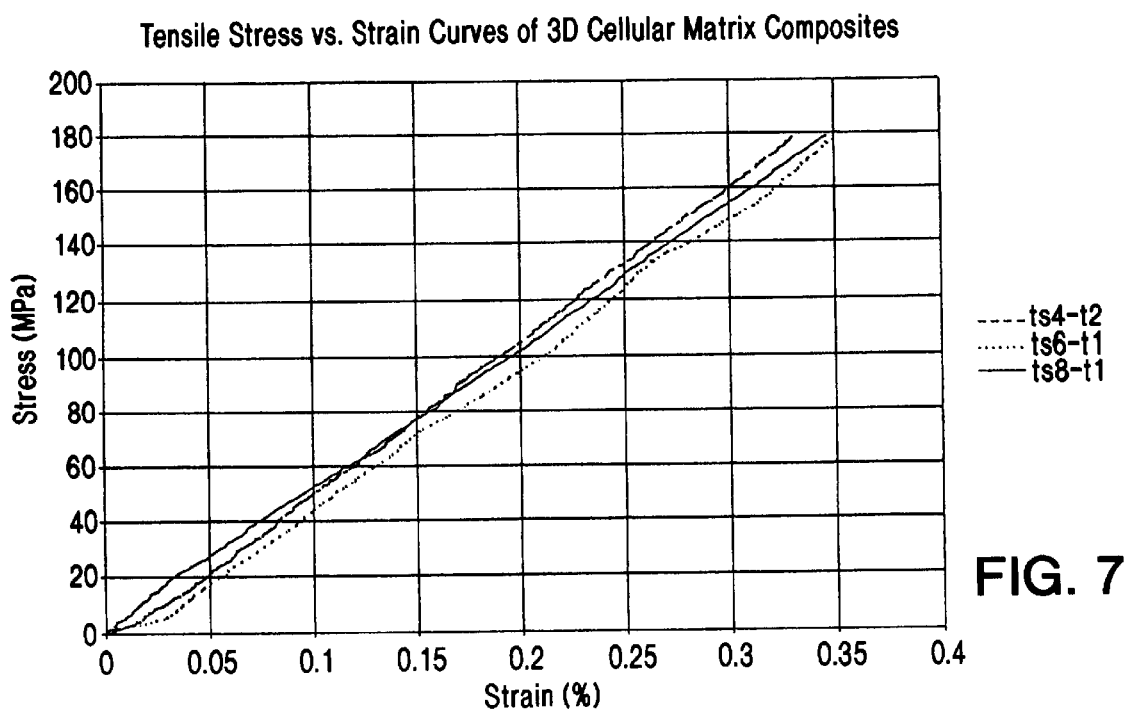
FIG. 7 is a chart illustrating tensile test results of the three-dimensionally reinforced cellular matrix composite of the present invention.
Figure 8:
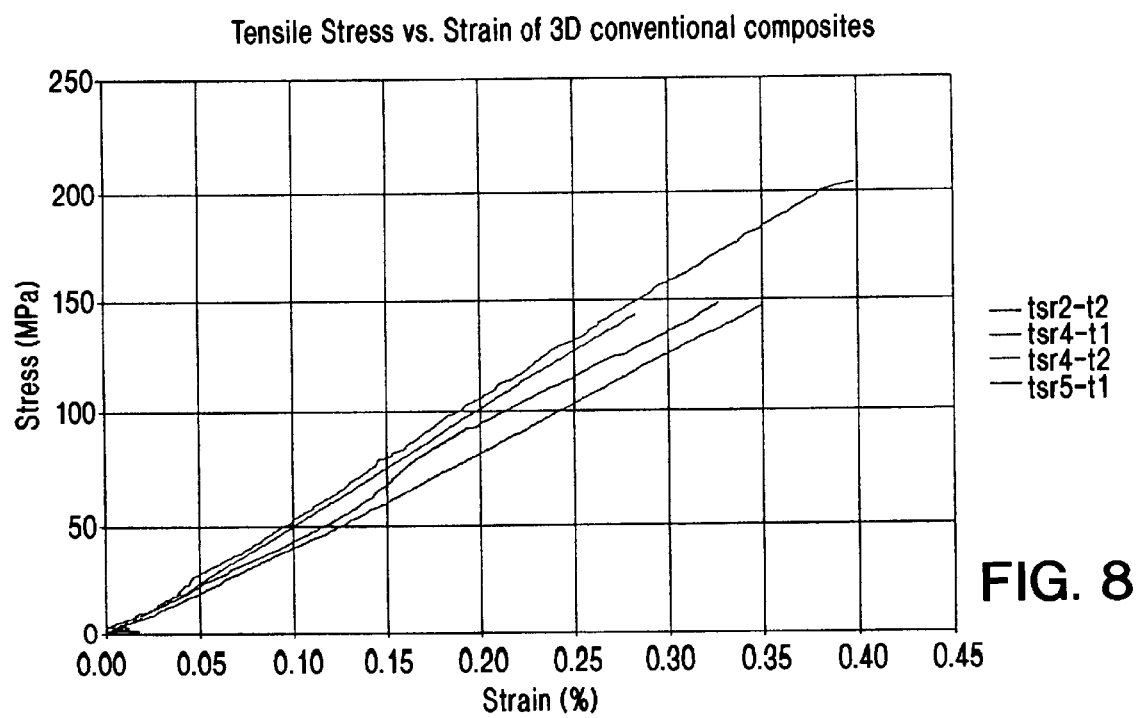
FIG. 8 is a chart illustrating tensile test results of a control composite impregnated with pure (no voids) epoxy resin.

Tensile Test (FIGS. 7 and 8)

Referring to FIGS. 7 and 8, tensile test results showed that the mean tensile strength of the cellular matrix composite C is about 10.5 GPa while that of the control group is about 9.8 GPa with the same amount of fibers but 20% more cross-sectional area covered by pure epoxy resin. Using the simple Rule of Mixture (ROM), the difference in tensile strength between the two groups was less than 10%. Since the 3-D CMC is 30% or more lighter than the control composite, its strength per unit mass is about 29% higher than that of the control composite. The moduli of the two composites are approximately the same, namely around 50 GPa on average. Therefore, the modulus per unit weight is about 40% higher for the 3DCMC composite.

Figure 9:
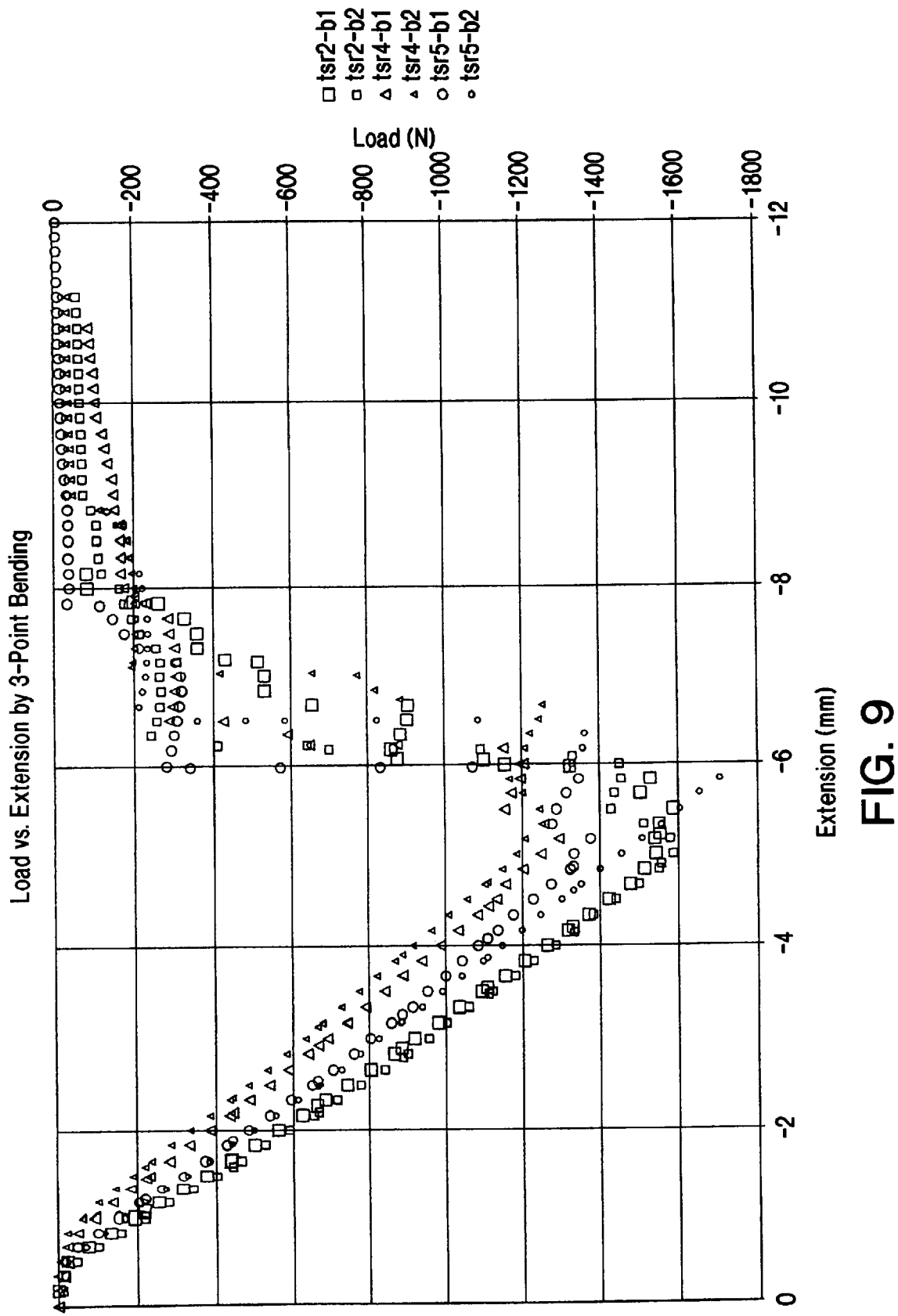
FIG. 9 is a chart illustrating load versus deflection curves in three point bending test of the three-dimensionally reinforced cellular matrix composite of the present invention.
Figure 10:
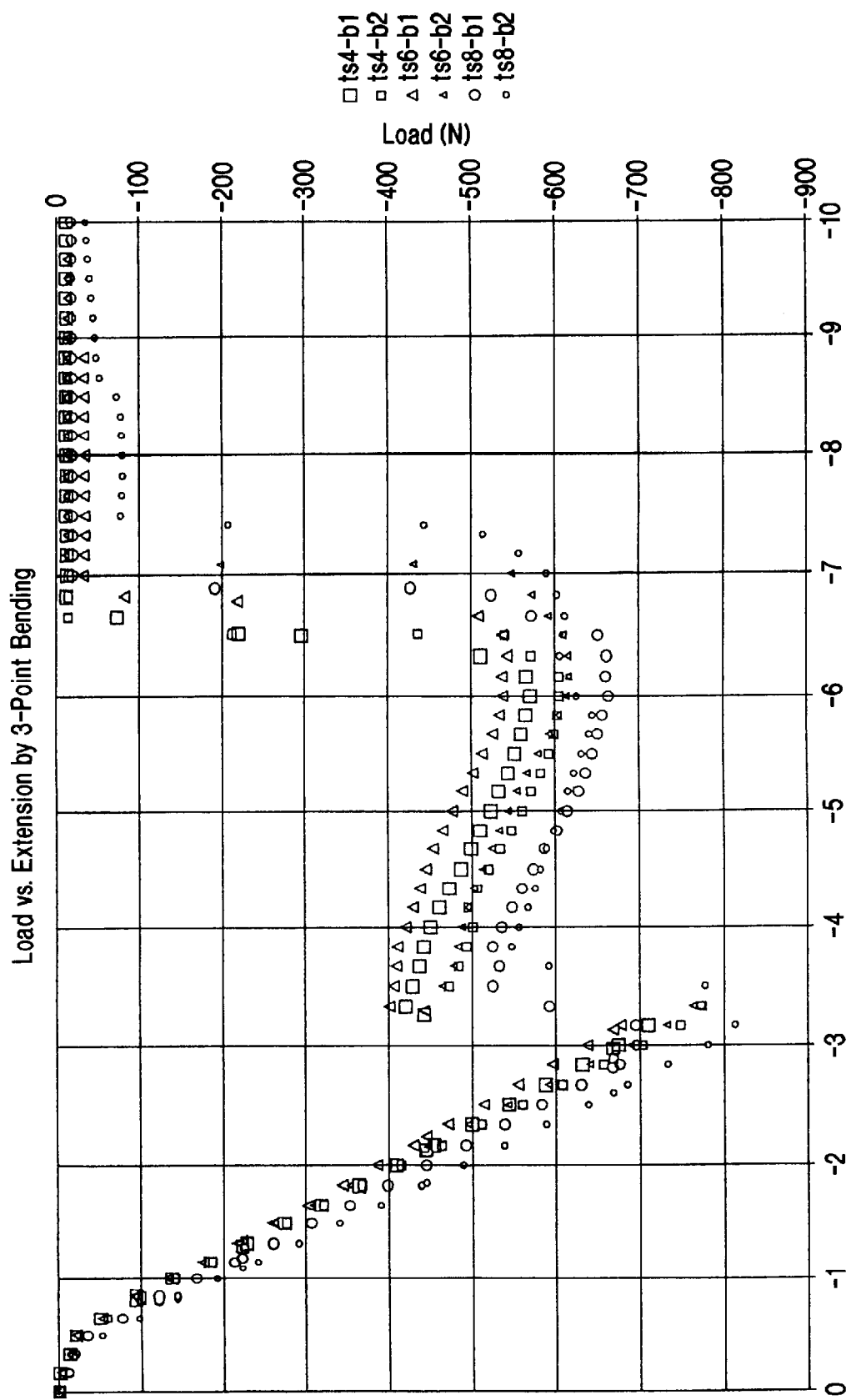
FIG. 10 is a chart illustrating load versus deflection curves in three point bending test of a control composite material impregnated with pure (no voids) epoxy resin.

Three-Point Bending Test (FIGS. 9 and 10)

Referring to FIGS. 9 and 10, the load versus deflection curves of the 3-point bending test of the two composites shows that the mode of failure changed for the 3-D CMC composite from brittle failure of the control group to failure of individual layers. The control composite failed with a single peak, indicating that once a crack formed, it traveled through the whole cross-section resulting in a catastrophic failure. For the 3-D CMC, a pseudo ductile failure curve was evidenced with one peak, representing the failure of the outermost layer, followed by a much wider second peak at a much greater deflection. It was obvious that the crack developed in the first layer did not directly travel through the matrix to reach the second layer. The cells in the structure stopped the propagation of the crack. The energy, which is proportional to the area under the load-deflection curve, absorbed by the 3-D CMC was much higher than that absorbed by the control composite due to this failure mode change.

It will be understood that various details of the invention may be changed without departing from the scope of the invention. Furthermore, the foregoing description is for the purpose of illustration only, and not for the purpose of limitation—the invention being defined by the claims.

What is claimed is:

1. A lightweight and impact resistant composite material comprising:
    (a) a substantially non-compressible uni-layer three-dimensional textile structure preform formed of at least three mutually perpendicular systems of yarns that define a plurality of interstices within said textile structure; and
    (b) a cellular matrix material that substantially fills the interstices of said three-dimensional textile structure and serves to create voids therein.
2. The lightweight and impact resistant composite material according to claim 1, wherein said three-dimensional textile structure preform is a three-dimensional fabric.
3. The lightweight and impact resistant composite material according to claim 2, wherein the three-dimensional fabric comprises three orthogonally woven yarn systems.
4. The lightweight and impact resistant composite material according to claim 2, wherein the three-dimensional fabric comprises a plurality of braided yarn systems.
5. The lightweight and impact resistant composite material according to claim 2, wherein the three-dimensional fabric comprises a plurality of circular woven yarn systems.
6. The lightweight and impact resistant composite material according to claim 2, wherein the three-dimensional fabric comprises a plurality of biaxial weft knit yarn systems.
7. The lightweight and impact resistant composite material according to claim 1, wherein said cellular matrix material comprises a polymer.
8. The lightweight and impact resistant composite material according to claim 7, wherein said polymer comprises an epoxy resin.
9. The lightweight and impact resistant composite material according to claim 8, wherein said epoxy resin comprises a thermosetting epoxy resin.
10. The lightweight and impact resistant composite material according to claim 1, wherein the cellular matrix material comprises bubbles defining a void diameter of at least about 0.01 to 10.0 µm.
11. The lightweight and impact resistant composite material according to claim 1, wherein the composite material has a specific density of about 0.88 to 1.02 grams/cm$^3$.

* * * * *